United States Patent [19]

Söderström

[11] 3,780,768
[45] Dec. 25, 1973

[54] FILLING AND EMPTYING VALVE

[75] Inventor: Hans Sture Söderström, Trelleborg, Sweden

[73] Assignee: Trelleborgs Gummifabriks Aktiebolag, Trelleborg, Sweden

[22] Filed: Apr. 5, 1972

[21] Appl. No.: 241,261

[30] Foreign Application Priority Data
Apr. 6, 1971  Sweden .............................. 4443/71

[52] U.S. Cl........... 137/625.48, 141/18, 222/402.16
[51] Int. Cl............................................. F16k 11/02
[58] Field of Search.................... 137/625.48, 625.4, 137/614.17, 588; 141/18; 222/402.16

[56] References Cited
UNITED STATES PATENTS

| | | | |
|---|---|---|---|
| 3,147,763 | 9/1964 | Morton ...................... | 137/614.17 X |
| 2,802,490 | 8/1957 | Ward ......................... | 222/402.16 X |
| 2,962,038 | 11/1960 | Bird ........................... | 137/614.17 X |
| 2,998,168 | 8/1961 | Waldherr ................... | 222/402.16 X |
| 3,032,077 | 5/1962 | Plock et al. ................ | 137/614.17 X |
| 3,051,246 | 8/1962 | Clark, Jr. et al. .......... | 137/614.17 X |
| 3,398,769 | 8/1968 | Guenin ...................... | 137/588 X |
| 3,393,491 | 7/1968 | Burton et al. .............. | 137/614.17 X |
| 3,495,622 | 2/1970 | Rose ........................... | 137/588 |
| 3,516,452 | 6/1970 | Scholle ....................... | 141/18 |
| 3,631,877 | 1/1972 | Barosko ...................... | 137/588 X |

Primary Examiner—Samuel Scott
Attorney—Francis C. Browne et al.

[57] ABSTRACT

Filling and emptying valve for containers and especially for inflatable cushions for cargo protection. The valve comprises a valve housing for mounting in an opening in a wall of a container or cushion and a valve holding body with emptying, filling and closing valves. The emptying and closing valves define a valve chamber, in which the non-return type filling valve opens. In the valve housing the valve holding body is movable between three working positions, a first position in which the valve is completely closed, a second position in which the closing valve is open and connects the valve chamber with the interior of the container or cushion and permits filling the container or cushion through the filling valve, and a third position in which the emptying and closing valves are open for connecting the interior of the container or cushion with the atmosphere.

1 Claim, 4 Drawing Figures

PATENTED DEC 25 1973 3,780,768

FILLING AND EMPTYING VALVE

This invention relates to a filling and emptying valve of the kind having a valve housing with suitable fastening means for mounting it in an opening formed in the wall of a container or like means, and a valve holding body arranged to be screwed into and out of said valve housing and having emptying, filling and closing valves.

The valve according to the invention is intended particularly for inflatable containers, such as cushions for cargo protection and like means, but the invention is not restricted solely to this use.

According to the invention the filling valve arranged in the valve holding body is formed as a non-return valve, and the outlet of the filling valve opens into a valve chamber arranged in a bore in the valve housing and defined by the closing and emptying valves of the valve seats of which are bores in the valve housing and the valve members of which are sealing rings disposed on the outer side of the valve holding body and movable into sealing engagement with the walls of said bores, and the relative lengths of the bores forming the emptying and closing valve seats are such that the closing valve can be opened first and then also the emptying valve by a successive but still incomplete screwing of the valve holding body out of the valve housing. The complete screwing of the valve holding body out of the valve housing is prevented preferably with the aid of some stop means, such as a locking ring, or by the threads of the valve holding body being deformed after mounting.

The described construction of the valve according to the invention will provide a very simple and robust valve which thus withstands heavy mechanical stresses without any damage to vital parts thereof. According to the invention, the valve will also have a larger filling and emptying capacity and a better operational reliability than prior art valves of the same type.

A prior art valve of a similar type suffered from the drawback that it was necessary completely to screw out from the valve housing the valve holding body and the filling valve arranged therein and formed as a non-return valve, when it was desired to empty the container. Thus, this prior art valve did not comprise any particular emptying valve.

Another prior art valve of a similar type had a valve member common to the filling and closing valves, and said valve member served as a non-return valve in filling position and was then urged into sealing engagement, upon complete screwing of the valve holding body into the valve housing, with a valve seat arranged at the bottom of the valve housing. However, the latter prior art valve made it possible to empty the container without completely screwing the valve holding body out of the valve housing, but the filling valve was formed as internal threads in the valve housing and as external threads on the valve holding body, while the inner wall of the valve housing at the top had one or more recesses formed therein, through which emptying could be performed upon partial screwing of the valve holding body out of the valve housing. This prior art valve suffered not only from the drawback that a great force was required for attaining a complete sealing capacity of the closing valve, but also the drawback that the edges of the recesses formed at the top of the valve housing tended to function as a threading die and to damage the threads on the outer side of the valve holding body. It has been found that the latter drawback resulted in too rapid a wear of the valve.

All the drawbacks inherent in the prior art valves are eliminated by the filling and emptying valve according to the invention.

An embodiment of the invention will be more fully described hereinbelow with reference to the accompanying drawing in which.

Figure 1:
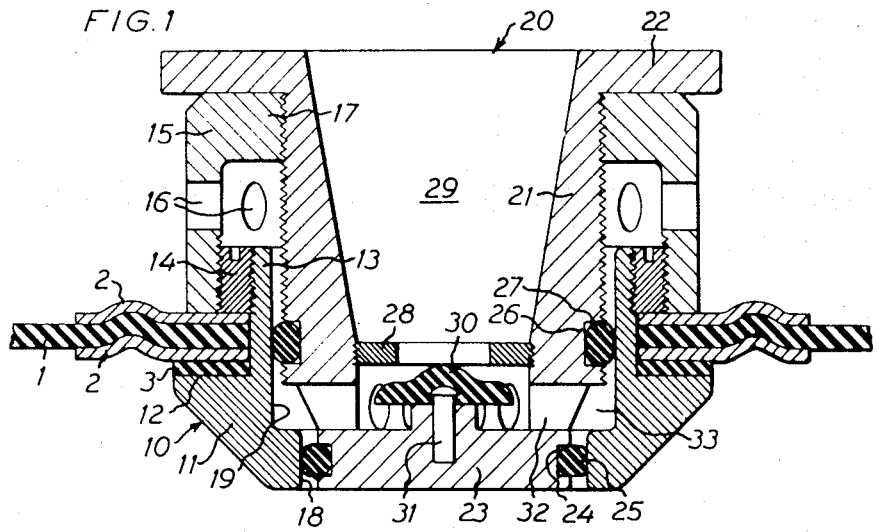
FIG. 1 is an axial section of the valve in the wholly closed position.

The valve illustrated in the drawing is used as a filling and emptying valve in the wall 1 of a cushion for cargo protection. The valve is hermetically secured in the wall of the cushion or container in that the wall 1 is clamped between two holder rings 2 which are pressed into sealing engagement with a sealing ring 3. If necessary, the wall 1, the holder rings 2, and the sealing ring 3 may be adhesively secured to each other. The valve has a valve housing 10 and a valve holding body 20. The valve housing 10 comprises a main portion 11 with an abutment surface 12 against which the sealing ring 3 is pressed. The main portion 11 also has an externally threaded socket 13 which projects through the opening in the container wall 1. The holder rings and the container wall 1 placed between them are pressed against the sealing ring 3 and the abutment 12 by means of an internally and extending threaded clamping ring 14. An outer sleeve 15 is screwed onto the external threads of the clamping ring 14. Said outer sleeve 15 had a numer of preferably uniformly distributed outlet openings 16 and at the upper end an inwardly projecting threaded flange 17. The valve housing 10 also has two concentrical bores 18 and 19 which form valve seats for a closing valve and an emptying valve, respectively. The bore 18 forming the valve seat of the closing valve is of a smaller diameter than that of the bore 19 which forms the valve seat of the emptying valve.

The valve holding body 20 has an externally threaded, cup-shaped main portion 21 which is screwed into the threads of the threaded flange 17 of the valve housing. The cup-shaped main portion 21 at the top has an outwardly directed flange 22 which preferably has a knurled outer circumferential surface to facilitate screwing of the valve holding body into and out of the valve housing. Formed at the outer edge of the bottom 23 of the cup-shaped main portion 21 is a groove 24 for a sealing ring 25 which functions as the valve member in the closing valve and is thus pressed into sealing engagement with the wall of the bore 18. Formed at the lower end of the external threads of the main portion 21 is a further external groove 26 in which a further sealing ring 27 is arranged. Said sealing ring 27 functions as the valve member of the emptying valve and is therefore pressed into sealing engagement with the bore 19 in the valve housing when the valve member is in the position shown in FIG. 1.

Disposed at the bottom of the cup-shaped main portion 21 is a non-return valve, which functions as a filling valve. This non-return valve has a valve seat 28 which is secured in some suitable way, for instance by being screwed onto suitable threads, at the inner end of the conical inlet 29 of the cup-shaped main portion 21.

The valve member 30 of the non-return valve has a spindle 31 which is mounted in a corresponding recess at the bottom 23. The outlet of the non-return valve is in the form of a number of preferably uniformly distributed radial bores 32 in the main portion 21. Said bores 32 open into an annular chamber 33 in the valve housing. Said annular chamber 33 is defined by the emptying valve 19, 27 and the closing valve 18, 25.

The filling and emptying valve according to the invention illustrated in the accompanying drawing is mounted as follows. The main portion 11 of the valve housing and the clamping ring 14 are screwed together so that the container wall 1 is clamped between the holder rings 22 and so that the inner holder ring 2 is pressed into sealing engagement with the sealing ring 3. The sleeve 15 is mounted to the valve holding body 20 before the sleeve 15 is screwed onto the threaded outer side of the clamping ring 14. Upon assembly of the sleeve 15 and the valve holding body 20 the sleeve 17 is screwed onto the external threads of the main portion 21 before the sealing ring 27 is disposed in its groove 26. After the parts 15, 20 have been screwed together it is suitable to prevent complete screwing of the part 20 out of the valve housing by deforming the threads immediately above the groove 26. As an alternative, it is possible to place a locking pin or a locking ring immediately above the groove 26, said locking pin or said locking ring preventing the valve holding body 20 from being screwed out of the valve housing. After the sealing ring 27 has been mounted in position in the groove 26 the sleeve 17 is screwed onto the external threads of the clamping ring 14. The valve is now assembled.

As will appear from FIG. 1 the external threads on the main portion 21 of the valve holding body have such a diameter that the teeth apices go free from the bore 19 in the valve housing. This is imperative as the bore 19 serving as a valve seat would otherwise be damaged.

Figure 2:
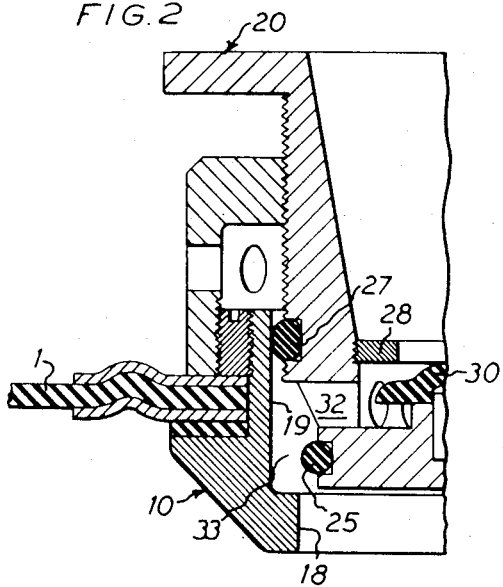
FIG. 2 shows the valve in filling position with opened filling valve.
Figure 3:
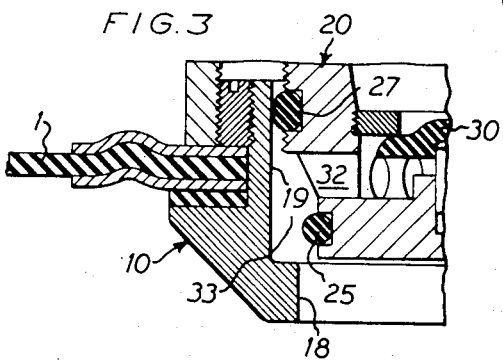
FIG. 3 shows the valve in filling position with closed filling valve.

The function of the valve according to the invention will appear upon a comparison of the four Figures in the drawing. In FIG. 1, the valve is completely closed so that both the flow into and that out of the valve is obviated by the sealing ring 25 which has been sealingly urged against the wall of the bore 18. In FIG. 2, the valve holding body 20 has been partially screwed out, and the sealing ring 27, that is the valve member of the emptying valve, is still being sealingly pressed against the wall of the bore 19. However, the closing valve 18, 25 is open so that the space 33 in the valve housing is open towards the inner side of the container. The opening area is large since a great annular gap is formed at the transition between the bores 18 and 19. The non-return valve 28, 30 occupies the open position illustrated in FIG. 2, which is the result of an air or liquid flow from the inlet 29 through bores 32, space 33 and bore 18 to the inner side of the container. If the supply of air or liquid should cease, the non-return valve is closed, taking the position illustrated in FIG. 3.

Figure 4:
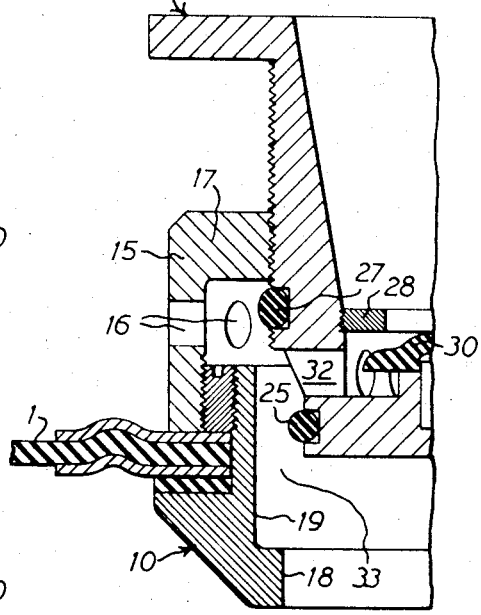
FIG. 4 shows the valve in emptying position.

If it is desired to empty the container the valve holding body 20 is screwed out some further distance from the valve housing to the position shown in FIG. 4. In this position both the closing valve and the emptying valve are open so that there is a free communication between the inner and outer sides of the container through the bores 18, 19 and 16. In this case also the cross-sectional area is large since a great annular gap is formed between the valve housing and the valve holding body 20.

In the embodiment illustrated in the drawing the valve member 30 of the non-return valve is freely movable in a bore in the valve holding body 20. If considered necessary, the valve member 30 can be loaded towards its valve seat by a suitable spring provided at the bottom of the bore for the spindle 31.

I claim:

1. Filling and emptying valve, comprising a valve housing for mounting in an opening in a wall of a container; a valve holding body; emptying, filling and closing valves in said valve holding body; said valve holding body being mounted in and coaxially with said valve housing; means defining a valve chamber, said valve chamber defining means consisting of said emptying and closing valves, said valve housing and said valve holding body; said filling valve opening into the valve chamber; said valve holding body being axially movable in relation to said valve housing and positionable in three working positions therein, a first working position, in which said emptying and closing valves are closed, a second working position in which said closing valve is open and connects the valve chamber with the interior of the container and permits filling the container through said filling valve, and a third position in which said emptying and closing valves are open for connecting the interior of the container with the atmosphere, said emptying and closing valves having valve seats which consist of bore-defining means of said valve housing and having valve members which consist of sealing rings mounted on said valve holding body.

* * * * *